(12) United States Patent
Boddie et al.

(10) Patent No.: US 7,618,075 B2
(45) Date of Patent: Nov. 17, 2009

(54) HYBRID TRUCK BED LINER

(76) Inventors: David Boddie, 15427 Draftwood Oak Ct., Houston, TX (US) 77059; Sean Morgan, 1120 NASA Pkwy., Houston, TX (US) 77058

( * ) Notice: Subject to any disclaimer, the term of this patent is extended or adjusted under 35 U.S.C. 154(b) by 0 days.

(21) Appl. No.: 12/175,144

(22) Filed: Jul. 17, 2008

(65) Prior Publication Data

US 2008/0277959 A1 Nov. 13, 2008

Related U.S. Application Data

(63) Continuation of application No. 11/545,316, filed on Oct. 10, 2006, now Pat. No. 7,416,236.

(51) Int. Cl.
*B60R 13/01* (2006.01)
(52) U.S. Cl. .................................................. 296/39.2
(58) Field of Classification Search ................ 296/39.2, 296/39.1
See application file for complete search history.

(56) References Cited

U.S. PATENT DOCUMENTS

| 4,150,186 | A | * | 4/1979 | Kazama ...................... 428/140 |
| 4,282,123 | A | | 8/1981 | Ilaria |
| RE32,198 | E | | 7/1986 | Wayne |
| 4,692,382 | A | | 9/1987 | Schmitt et al. |
| 5,084,521 | A | | 1/1992 | White |
| 5,096,962 | A | | 3/1992 | Holmes-Farley et al. |
| 5,114,783 | A | | 5/1992 | Hodnett, III |
| 5,254,395 | A | | 10/1993 | Hodnett, III |
| 5,308,133 | A | | 5/1994 | Mangum et al. |
| 5,436,112 | A | | 7/1995 | Hsieh et al. |
| 5,636,883 | A | * | 6/1997 | Johns ........................ 296/39.2 |
| 5,739,194 | A | | 4/1998 | Natesh et al. |
| 6,076,879 | A | | 6/2000 | Bills et al. |

OTHER PUBLICATIONS

U.S. Office Action issued in corresponding U.S. Appl. No. 11/545,316; dated Sep. 21, 2007; 12 pages.
U.S. Office Action issued in corresponding U.S. Appl. No. 11/545,316; dated Mar. 19, 2008; 11 pages.

* cited by examiner

*Primary Examiner*—Lori L Lyjak

(57) ABSTRACT

An apparatus to protect a wear surface of a vehicle, the apparatus having a resilient layer and a fabric layer bonded to the resilient layer, wherein the fabric layer is configured to be bonded to the wear surface of the vehicle. Other embodiments include an apparatus to protect a vehicle wear surface, the apparatus having a plurality of liner sections, wherein each liner section is configured to cover and be adhered to a portion of the vehicle wear surface, each of the plurality of liner sections including a resilient layer bonded to a fabric layer, wherein the fabric layer is configured to be adhered to the vehicle wear surface. Other embodiments include a method to protect a vehicle wear surface, the method including covering the vehicle wear surface with a plurality of liner sections wherein each liner section has a resilient layer and a fabric layer, adhering the fabric layer of each liner section to the vehicle wear surface, and joining adjacent liner sections together.

21 Claims, 5 Drawing Sheets

HYBRID TRUCK BED LINER

CROSS-REFERENCE TO RELATED APPLICATION

This application, pursuant to 35 U.S.C. § 120, claims benefit to U.S. patent application Ser. No. 11/545,316, filed Oct. 10, 2006, incorporated by reference in its entirety.

BACKGROUND OF INVENTION

1. Field of the Invention

Embodiments disclosed herein relate generally to liners for pickup truck beds, sport utility vehicles, vans, and trailers. Specifically, embodiments disclosed herein relate to a hybrid truck bed liner, encompassing benefits of both drop-in and spray-in liners.

2. Background

Bed liners are commonly used to protect the bed or cargo area of a vehicle from detrimental physical impacts, surface abrasion, or corrosion due to reactive chemicals. Liner products have been used in SUV or van cargo areas, cabinets (such as for the storage compartments of a fire engine or a boat), and, most commonly, in the beds of pickup trucks.

Liners for cargo areas may include carpeting or other textiles, such as a trunk liner. For example, U.S. Pat. No. 5,721,177 discloses nonwoven moldable composites for use as a trunk liner. The nonwoven composite may be made by admixing and encapsulating reinforcement fibers with a thermoplastic resin formed from melted and compressed thermoplastic fibers having a melting point less than the melting point of the reinforcement fibers. A decorative or reinforcing covering material, such as carpets, cloths, and the like, may also be attached to the nonwoven composite. Other examples of textiles that may be used to line a trunk or cargo area are disclosed in U.S. Pat. Nos. 4,818,586, 5,436,064, 5,492,580, and 5,600,974. Many of these textiles, however, do not have the impact or chemical resistance, such as may be obtained with a rubberized non-skid surface, desired for use in the beds of pickup trucks.

Liners commonly used in pickup trucks generally include "spray-in" and "drop-in" liners. Drop-in liners are a preformed rigid plastic component that form-fits the bed to be protected. Drop-in liners are described in, for example, U.S. Pat. Nos. 6,692,054, 6,237,980, 4,575,146, 4,540,214, 4,181,349, RE32,198, and others. Spray-in liners are formed by spraying a polymer coating into the truck bed or vehicle cargo area and then curing the polymer coating. Spray-in liners are described in, for example, U.S. Pat. Nos. 6,613,389, 6,533,189, and 6,126,999, among others.

Although serving to protect the cargo areas covered, the above described liners also have drawbacks. For example, spray-in liners generally require professional installation including an initial scuffing or sand-blasting of the surface prior to installation to ensure the formation of a permanent bond between the liner and the truck bed. Other negative aspects of spray-in liners may include overspray, health issues (such as from the use of isocyanates), poor consistency of the finished product, masking of the truck bed, the need for complex equipment, and the overall appearance of the final product. Additionally, the permanence of the installation means that if any damage, fading ("chalking"), or staining of the liner occurs, an expensive liner removal process may be necessary to restore the liner's appearance.

Drop-in liners also have various drawbacks. For example, drop-in liners often require the drilling of holes in the body of the bed for installation, thus exposing portions of bare metal in the bed and possibly imparting rust-initiating stress in the metal. Further, drop-in liners typically have slick surfaces, allowing unwanted sliding of cargo in the bed. Furthermore, water, salt, sand, and grit may get under the bed liner, causing damage (e.g., rust), and vibration of a poor-fitting drop-in liner may also damage the bed of the truck. Moreover, the bulky drop-in liners, tailored for each pick-up truck model, are difficult and costly for manufacturers and retailers to store and ship. Additionally, among other drawbacks, drop-in liners may crack or warp. Drop-in liners, due to their removable nature, have also reportedly blown out of the beds of pickup trucks at high driving and wind speeds.

Several of these drawbacks are acknowledged in previous attempts to minimize their impact. For example, bed mats have been proposed to minimize the movement of cargo on the liner during use, such as disclosed in U.S. Pat. Nos. 5,988,723 and 5,695,235, or to minimize the rubbing between the liner and the cargo bed, such as disclosed in U.S. Pat. No. 6,431,629. Multi-piece or flexible bed liners have been proposed to minimize the storage and shipping of bed liners, such as in U.S. Pat. Nos. 5,806,909, 4,986,590 and U.S. Patent Application Publication No. 20020149223. And, removable bed liners, such as liners magnetically attached to the truck bed, or liners temporarily attached using suction cups, are disclosed in U.S. Pat. Nos. 5,806,909 and 4,279,439, respectively. A composite bed liner formed from spray-in and drop-in components is disclosed in U.S. Pat. Nos. 7,093,875 and 6,840,559. However, each of these solutions may result in additional installation cost, may be ineffective at preventing impact or corrosive damage, or may itself result in further damage to the bed.

Furthermore, the touted benefits of the various liners are often used to persuade the end-user (customer) in their choice of bed liners. For example, drop-in liners, in comparison to spray-in liners, better distribute the force of impacts, are better at protecting the surface from dents, are less expensive than spray-in liners, may be removed, and may be installed by a vehicle owner after market. Spray in liners, in comparison to drop-in liners, seal the bed surface, preventing water, salt, sand, and grit from getting between the liner and the surface, causing damage. Thus, there is a desire in the industry for a bed liner that encompasses the benefits of both drop-in and spray-in liners.

SUMMARY OF INVENTION

In one aspect, embodiments disclosed herein relate to an apparatus to protect a wear surface of a vehicle. The apparatus may include a resilient layer and a fabric layer bonded to the resilient layer, wherein the fabric layer is configured to be bonded to the wear surface of the vehicle.

In another aspect, embodiments disclosed herein relate to an apparatus to protect a vehicle wear surface. The apparatus may include a plurality of liner sections, wherein each liner section is configured to cover and be adhered to a portion of the vehicle wear surface, each of the plurality of liner sections including a resilient layer bonded to a fabric layer, wherein the fabric layer is configured to be adhered to the vehicle wear surface.

In another aspect, embodiments disclosed herein relate to a method to protect a vehicle wear surface. The method may include covering the vehicle wear surface with a plurality of liner sections, wherein each liner section comprises a resilient layer and a fabric layer, adhering the fabric layer of each liner section to the vehicle wear surface, and joining adjacent liner sections together.

Other aspects and advantages of the invention will be apparent from the following description and the appended claims.

DETAILED DESCRIPTION

In one aspect, embodiments disclosed herein relate to a composite liner useful for protecting a substrate from damage. In some aspects, the liners disclosed herein may include a fabric layer disposed on or within a resilient layer, and optionally a layer of flexible or rigid foam. The fabric layer, in some embodiments, may serve as a reinforcing layer or may serve as a bridge for bonding the resilient layer to a substrate. In other aspects, embodiments disclosed herein may include a liner that is removably bonded to a substrate.

Figure 1:
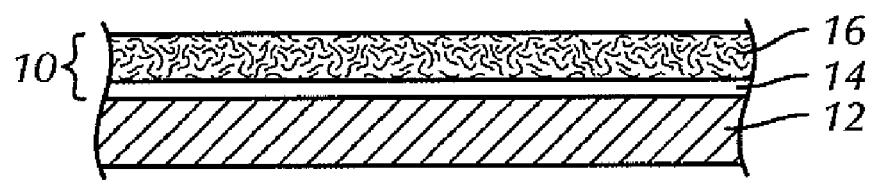
FIG. 1 and FIG. 1A are schematic drawings of a liner formed in accordance with embodiments disclosed herein.
Figure 1A:
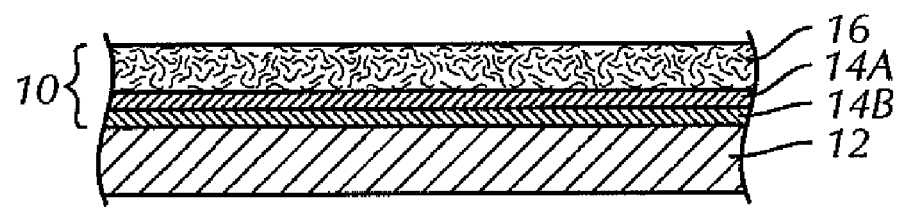

Referring now to FIG. 1, one embodiment of the liner described herein is illustrated. A liner 10 may be disposed on or adhered to the surface of a substrate 12, where the surface and integrity of substrate 12 are desired to be protected from damaging chemicals and/or impacts. Liner 10 may include a fabric layer 14 and a resilient layer 16. In various embodiments, liner 10 may include one or more fabric layers 14 and one or more resilient layers 16. One such embodiment is illustrated in FIG. 1A, having a resilient layer 16, a first fabric layer 14A bonded to the resilient layer 16, and a second fabric layer 14B bonded to the first fabric layer 14A and configured to be bonded to the substrate 12.

Substrate 12 may include various metallic, mineral, composite, alloy, fiberglass, cellulosic (wood), or polymeric surfaces that are desired to be protected from deleterious chemical and/or physical attack. For example, in some embodiments, substrate 12 may include iron, steel, aluminum, and other metals, such as is commonly used in the manufacture of trucks, boats, trailers, SUVs, and RVs. In other embodiments, substrate 12 may include fiberglass, carbon-fiber composites, polymers and wood species.

As described briefly above, embodiments of the liner described herein include various components and methods for attachment, and in some embodiments may be easily removed from a substrate. Each of these is described in more detail below, followed by additional embodiments of the liner.

Resilient Layer

In various embodiments of the liner described herein, chemical, abrasion, and/or impact resistance is desired. The resilient layer, in some embodiments, may provide impact and abrasion resistance. In other embodiments, the resilient layer may provide chemical resistance. In various embodiments, the resilient layer may provide impact, abrasion, and chemical resistance.

In various embodiments, the resilient layer may be formed from a urethane-based rubber. In some embodiments, the urethane based rubber may be formed using a resin blend of polyurethane and polyurea activated with an isocyanate.

In other embodiments, the urethane rubber may be formed by providing a water curable liquid rubber urethane and a water-based acrylic. The rubber based urethane may be a moisture-cured, liquid applied polyurethane. The urethane may be either aliphatic or aromatic, and may be based on aliphatic isocyanates, aromatic isocyanates, or aromatic-aliphatic isocyanates, and combinations thereof. The rubber based urethane may be selected from any one of the group consisting of natural rubbers, recycled rubbers, styrene butadiene, polybutadiene, polyisoprene, ethylene propylene, chloroprene, acrylonitrile-butadiene, ethylene-propylene, chloroprene, acrylonitrile-butadiene, and ethylene-propylenediene monomer, isopreneisobutylene.

In some embodiments, the resilient layer may be heat vulcanized, pressure-cured, post-cured, room-temperature cured or vulcanized, and combinations thereof. Those of ordinary skill in the art will recognize that other forms of post-formation treatment may also be possible.

Any water-based acrylic may also be used with the present invention. The base polymer for this dispersion may be a carboxyl-functional acrylic resin, which may be neutralized with amine to form an anionic dispersion. The dispersion may further comprise acrylic resin, triethylamine, xylene, and propoxyethanol, in varying weight ranges.

In other embodiments, the resilient layer may be formed from a liquid sprayable epoxy composition comprising a liquid epoxy resin, an effective reinforcing amount of fiber, an elastomeric component, and an amine containing epoxy curing agent capable of curing the composition at temperatures equal to or greater than 40° F. wherein the cured product is light stable and has a hardness on the Shore D scale. In other embodiments, the resilient layer may be formed in situ as a cured product by spraying, brushing, or rolling the epoxy composition onto the substrate, such as the truck bed, curing and forming the product on the substrate at a temperature of at least 40° F. The ratio of epoxy reactive groups to amine reactive groups may range from 0.9:1.0 to 1.1:1.0.

In other embodiments, the resilient layer may be formed from aqueous dispersions of urethane polymers and vinyl polymers (e.g., acrylics) that provide water-based coating compositions with good adhesion following humidity exposure. The dispersion is predominately urethane, and the polyurethane is made from a first and a second polyisocyanate, the first polyisocyanate having at least one open carbon chain greater than six carbon atoms in length between two isocyanate groups, preferably at least eight carbon atoms in length. The vinyl monomers are polymerized in the presence of the aqueously dispersed polyurethane.

In other embodiments, the resilient layer may include any type of resilient material, such compounds as disclosed in U.S. Pat. Nos. 6,533,189, 6,126,999, 5,739,194, 5,436,112, 5,084,521, 4,282,123, and 4,692,382, among others. In other embodiments, the resilient layer may include an acrylate polymer, a urethane polymer, a heat vulcanized rubber, a vinyl rubber, a vinyl polymer, a polyolefin, a urethane rubber, a vulcanized urethane, or combinations thereof.

In other embodiments, the resilient layer may include two or more layers adhered to one another. For example, the resilient layer may include a coating system which forms a highly abrasion resistant, chemical resistant, impact resistant protective finish for a substrate. The outermost or surface coating layer may be a highly cross-linked hard polymer, which may be adhered to an underlying base coating layer of a compatible softer polymer. The outer hard polymer preferably may include a highly crosslinked acrylic polymer, while the underlying softer polymer may include a crosslinked urethane polymer.

In other embodiments, a resilient layer may be formed from one or more of the compounds and coatings described above. In other embodiments, the resilient layer may be formed from the coating systems disclosed in U.S. Pat. Nos. 5,114,783 and 5,254,395.

In some embodiments, the resilient layer may have an average thickness in the range from 0.1 mm to 50 mm (0.004 inches to 2 inches). In other embodiments, the resilient layer may have an average thickness in the range from 1 mm to 38 mm (0.040 inches to 1.5 inches); from 2.5 mm to 31.75 mm (0.1 inches to 1.25 inches) in other embodiments; and from 12 mm to 25 mm (0.5 inches to 1.0 inches) in yet other embodiments.

The preferred texture of the exposed surface of the liner may depend upon the intended use of the surface. In some embodiments, the resilient layer may include an outer surface that is rough in texture. In other embodiments, the resilient layer may include an outer surface that is smooth in texture. In some embodiments, the resilient layer may include an outer surface that is substantially flat. In other embodiments, the resilient layer may include an outer surface that is ribbed or corrugated, such as to mate with the raised portions of a truck bed. In various embodiments, the ribbed surface may provide additional strength to the liner or may facilitate drainage from the liner. In some embodiments, the resilient layer may be flexible. In other embodiments, the resilient layer may be rigid. In other embodiments, the resilient layer may include an outer surface that includes graphics or decorative texturing, such as company logos, animal skins, and other decorative patterns and textures, for example.

The hardness of the resilient layer, in some embodiments, may be such that it aids in preventing objects from sliding on its surface. In other embodiments, the hardness of the resilient layer may be such that it absorbs energy when struck with an impact, such as to prevent the substrate from being deformed.

In other embodiments, the resilient layer may provide a surface that is resistant to corrosive or reactive chemicals. In this manner, the resilient layer may protect the substrate by providing a non-reactive or non-permeable buffer between a corrosive chemical and the substrate.

In some embodiments, the resilient layer may have a durometer hardness of at least 10 on a Shore A scale. In other embodiments, the resilient layer may have a durometer hardness of at least 30 on a Shore D scale. In other embodiments, the resilient layer may have a durometer hardness from about 10 on a Shore A scale to about 80 on a Shore D scale.

Fabric Layer

Embodiments of the liner disclosed herein may include one or more fabric layers. The fabric layers may serve as a strength reinforcement of the resilient layer, may serve as an aid for bonding the resilient layer to a substrate surface, or a combination thereof. The fabric layer, in various embodiments, may include woven or non-woven, natural or synthetic, components or fibers. The fabric layer may provide enhanced dimensional stability to the liner structure, and may also provide surface area for the application of direct glue-down adhesives.

In other embodiments, the fabric layer may serve as a bridge for the adhesion of the liner to a substrate surface. In other embodiments, the fabric layer may serve as a bridge for the adhesion of the liner to a flexible foam intermediate the liner and the substrate surface. Such a bridge may be necessary where adhesion of the resilient layer to the substrate surface would be impracticable, such as where the resilient layer contains a mold-release agent limiting the bonding that may occur between the resilient layer and a substrate surface, for example.

In some embodiments, the resilient layer may be disposed on or adhered to the fabric layer. In other embodiments, the resilient layer may be vulcanized to the fabric layer. In other embodiments, the fabric layer may be disposed partially or wholly within the resilient layer. For example, in some embodiments where a fabric layer is disposed wholly within the resilient layer, that fabric layer may reinforce the strength of the resilient layer. In other embodiments, where a fabric layer is disposed partially within the resilient layer, the fabric layer may act as a bridge for the adhesion of the liner to a substrate surface.

Fabrics and fibers suitable for making the woven or non-woven fabric layer may include any natural or synthetic cellulosic fibers including cotton, abaca, kenaf, sabai grass, flax, esparto grass, straw, jute hemp, bagasse, milkweed floss fibers, and pineapple leaf fibers; and woody fibers. In other embodiments, the fabric layer may include synthetic fibers such as rayon, polyolefin fibers, polyester fibers, bicomponent sheath-core fibers, multi-component binder fibers, and the like. Synthetic cellulose fiber types include rayon in all its varieties and other fibers derived from viscose or chemically-modified cellulose. In other embodiments, suitable synthetic fibers may include, but are not limited to, rayon fibers, ethylene vinyl alcohol copolymer fibers, polyolefin fibers, polyesters, carbon fibers, silicon nitride fibers, and the like.

In addition, synthetic fibers may also be utilized in the present invention. The discussion herein regarding pulp fibers is understood to include synthetic fibers. Some suitable polymers that may be used to form the synthetic fibers include, but are not limited to: polyolefins, such as, polyethylene, polypropylene, polybutylene, and the like; polyesters, such as polyethylene terephthalate, poly(glycolic acid) (PGA), poly (lactic acid) (PLA), poly($\beta$-malic acid) (PMLA), poly($\epsilon$-caprolactone) (PCL), poly($\rho$-dioxanone) (PDS), poly(3-hydroxybutyrate) (PHB), and the like; polyamides, such as nylon, KEVLAR®, and the like, TEFLON®, and polyester nylons (EP). Synthetic or natural cellulosic polymers, including but not limited to: cellulosic esters; cellulosic ethers; cellulosic nitrates; cellulosic acetates; cellulosic acetate butyrates; ethyl cellulose; regenerated celluloses, such as viscose, rayon, and the like; cotton; flax; hemp; and mixtures thereof may be used in embodiments disclosed herein.

Other polymers suitable for use in the fabric layer may include thermoplastic and non-thermoplastic polymers including natural and synthetic polymers. In various embodiments, the fabric layer may include polymers such as ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Suitable polyolefins may include linear or low density polyethylene, polypropylene (including atactic, isotactic, syndiotactic and impact modified versions thereof) and poly(4-methyl-1-pentene). Suitable styrenic polymers may include polystyrene, rubber modified polystyrene (HIPS), styrene/acrylonitrile copolymers (SAN), rubber modified SAN (ABS or AES) and styrene maleic anhydride copolymers. In other embodiments, the fabric layer may include metal fibers, metal wire, metal mesh, metal belting or cording, or the like.

In some embodiments, the fabric layer may have an average thickness in the range from 0.05 mm to 5 mm (0.002 inches to 0.2 inches). In other embodiments, the resilient layer may have an average thickness in the range from 0.1 mm to 3.8 mm (0.004 inches to 0.150 inches); from 0.25 mm to 3.2 mm (0.010 inches to 0.125 inches) in other embodiments; and from 0.5 mm to 2.5 mm (0.020 inches to 0.10 inches) in yet other embodiments.

Foam Layer

In some embodiments, an optional foam layer may be disposed between the fabric layer and the substrate. In other embodiments, an optional foam layer may be incorporated as one layer in a multi-layer resilient layer, as described above. In some embodiments, the foam layer may comprise an expanded plastic, a polyolefin foam, a urethane foam, an ethylene-vinyl acetate foam, or combinations thereof. In some embodiments, the foam may be an open-cell foam, and in other embodiments, a closed-cell foam.

Adhesives

Adhesive materials, in some embodiments, include curable latex, urethane or vinyl systems. Styrene butadiene rubbers (SBR), for example, are one of the most common polymers used for latex adhesive backing materials.

In other embodiments, adhesives known as pressure sensitive adhesives (PSAs) and hot melt adhesives (HMAs) may be used. PSAs are a distinct category of adhesive, which, in dry (solvent free) form, are aggressive and permanently tacky at room temperature and adhere to a variety of surfaces without the need of more than pressure. They do not require activation by water, solvent, or heat. In contrast, HMAs are typically applied to a substrate while in its molten state and cooled to harden the adhesive layer. In some embodiments, HMAs with high heat resistance and/or good cold resistance may be used. PSAs may be used in other embodiments, and may provide many desirable characteristics such as removability and ease of application. In yet other embodiments, curable adhesives (e.g., heat or light-cured) may be used, particularly where substrates require substantial permanency and high strength adherence.

In other embodiments, a number of different polymers may be used as the base component of adhesives in accordance with embodiments disclosed herein. For example, ethylene vinyl acetate (EVA) based polymers may be used. Other embodiments may use polyethylene-based polymers, polypropylene-based polymers, propylene-ethylene copolymers, amorphous poly alpha-olefins, polyamides, block copolymers, and/or other polymers known in the art. For example, ethylene ethyl acrylate (EEA), styrene-isoprene-styrene copolymers, styrene-butadiene-styrene copolymers, as well as a number of other styrene copolymers (SEBS, SEPS, etc.), polyurethane, polyvinyl chloride, latex nitrile, acrylonitrile copolymers, acrylics (including pure acrylics as well as styrene acrylics and vinyl acrylics), and polyisobutylene may be used. In addition, polymers such as ethylene butyl acrylate (EnBA) and epoxydized polybutadiene (PBE) may be used. This non-comprehensive list is representative of the types of polymers that may be used in adhesive compositions in accordance with embodiments disclosed herein. Those having ordinary skill in the art will recognize that a number of other suitable polymers and adhesives exist. In certain embodiments, it is anticipated an adhesive may be prepared without the use of a tackifier or with a minimal quantity of tackifier. An adhesive may also prepared without a wax, such as a blend of a polymer and a tackifying resin. Other embodiments may use an adhesive such as a gelled form of cyano-acrylics, a slow-set urethane gel, a hot glue, a thixotropic glue.

In particular embodiments, the above described adhesives may be used to bond the resilient layer to the fabric layer. In other embodiments, the above described adhesives may be used to bond the bed liner to the surface of the substrate to be protected. In some embodiments, the fabric layer is bound to the substrate surface using an adhesive. In other embodiments, where the fabric serves as an interior reinforcement of the resilient layer or is partially vulcanized into the resilient layer, the resilient layer and/or the fabric layer may be bound to the substrate surface using an adhesive. In particular embodiments, the adhesive may adhere to a painted surface without requiring scarring, scuffing, or other damage of the painted surface.

In some embodiments, an adhesive bonding layer comprising a substrate intermediate two adhesive layers, such as double-sided tape for example, may be used to adhere the bed liner to the substrate to be protected. In some embodiments, the intermediate substrate may include hook and loop layers.

Another adhesive that may be used includes a one-component adhesive for metal surfaces such as iron, zinc, copper, cadmium and their alloys that will cure upon contact with the metal surface, such as that disclosed in U.S. Pat. No. 5,096,962, for example. The adhesive composition includes an olefinically unsaturated monomer; an acidic compound; a sulfonyl-containing compound; and a compound containing a transition metal. The adhesive composition may also optionally contain additional polymeric materials and will cure rapidly upon contact with a metal surface to form an adhesive bond between metal surfaces. The adhesive composition avoids the use of halide-containing compounds which can be undesirable in certain applications.

In some embodiments, the adhesive used may permanently bind or adhere the liner to a substrate surface. In other embodiments, the adhesive may removably bind the liner to a substrate surface, allowing the liner to be removed or partially removed from the substrate. Upon removal, in some embodiments, the adhesive may leave substantially no residue on the substrate surface.

In other embodiments, an adhesive may be used to bind the resilient layer to the fabric layer. In certain embodiments, the resilient layer is removably bound to the fabric layer, allowing removal of at least a portion of the resilient layer, such as where it is desired to repair or replace a portion of the resilient layer.

Additives

Embodiments of the bed liner or the individual components of the bed liner, including the cloth/fabric layer and the resilient layer, may include various additives. Additionally, the adhesive used to affix the liner to a substrate surface to be protected may include various additives. For example, embodiments may include a wetting agent, fire retardants, surfactants, anti-static agents, antifoam agent, anti block, wax-dispersion, pigments, a neutralizing agent, a thickener, a compatibilizer, a brightener, a rheology modifier, a biocide, a fungicide, reinforcing fibers, and other additives known to those skilled in the art. While optional for purposes of the present invention, other components may be highly advantageous for product stability during and after the manufacturing process. Other embodiments may include fillers, such as organic or inorganic particles, including clays, talc, titanium dioxide, zeolites, powdered metals, organic or inorganic fibers, including carbon fibers, silicon nitride fibers, steel wire or mesh, and nylon or polyester cording, nano-sized particles, clays, and so forth; tackifiers, rosins, modified rosins, oil extenders, including paraffinic or napthelenic oils; and other natural and synthetic polymers, including other polymers according to embodiments of the invention. Other embodiments may also contain organic or inorganic fillers or other additives such as starch, talc, calcium carbonate, glass fibers, polymeric fibers (including nylon, rayon, cotton, polyester, and polyaramide), metal fibers, flakes or particles, expandable layered silicates, phosphates or carbonates, such as clays, mica, silica, alumina, aluminosilicates or aluminophosphates, carbon whiskers, carbon fibers, nanoparticles including nanotubes, wollastonite, graphite, zeolites, and ceramics, such as silicon carbide, silicon nitride or titania. Silane-based or other coupling agents may also be employed for better filler bonding.

Other embodiments may contain processing oils, plasticizers, and processing aids. Other embodiments may include carbon black, an additive useful for UV absorption and stabilizing properties. Various embodiments may also contain anti-ozonants or anti-oxidants that are known to a rubber chemist of ordinary skill.

For providing additional stability against UV radiation, hindered amine light stabilizers (HALS) and UV absorbers may be also used. Other embodiments may include a heat stabilizer.

Other embodiments employ a crosslinking or curing agents, cure activators, and accelerators. In other embodiments, vulcanization retarders may also be used. In some embodiments, additives may also include perfumes, defoamers, algae inhibitors, dyes, pigments, or coloring agents, such as colorants formed from titanium oxides, iron oxides, and the like, adhesion promoters, anti-microbiological and anti-fungus agents, a polyaniline or polypyrrole, non-skid agents, bubble-release compositions, flame retardants and halogen-free flame retardants, as well as slip and anti-block additives.

Liner

As described above with reference to FIG. 1, one embodiment of the liner 10 described herein may include a fabric layer 14 and a resilient layer 16. In various embodiments, liner 10 may include one or more fabric layers 14 and one or more resilient layers 16. And, liner 10 may be disposed on or adhesively conjoined to a surface of a substrate 12.

Liner 10, including each of the above described layers (resilient, fabric, and adhesive, as applicable) may have an overall average thickness in the range from 0.1 mm to 50 mm (0.004 inches to 2.0 inches). In other embodiments, the resilient layer may have an average thickness in the range from 1 mm to 38 mm (0.040 inches to 1.5 inches); from 2.5 mm to 31.75 mm in other embodiments; and from 12 mm to 25 mm in yet other embodiments.

In some embodiments, at least a portion of the liner may be adhesively bound to a substrate. In other embodiments, a majority of the liner may be adhesively bound to a substrate. In other embodiments, the liner may be form fitted or molded such that the liner and the substrate form an intimate fit, similar to a male/female connection. In this manner, the liner may form an intimate bond or fit with the substrate, minimizing or eliminating gaps, exposed areas, or places where water, dirt and debris can accumulate under the liner, between liner component parts, or between the liner and the substrate. In some embodiments, as described above, the liner may be removably bound to a substrate.

Unitary Construction

In some embodiments, a liner may be constructed as a unitary part. In other embodiments, a liner may be form fitted or molded to mate with a desired cavity or surface.

Referring now to FIGS. 2A-2D, one embodiment of a liner used to protect a truck bed 20 is illustrated. Truck bed 20 may include a floor 22, front wall 24, and two side walls 25. The floor 22 of the truck bed is often contoured, including ridges 26, and an elevated portion 27 corresponding to wheel wells 28. Tailgate 29 may be connected to truck bed 20, forming an open-top enclosure with truck bed 20 when closed.

Figure 2A:
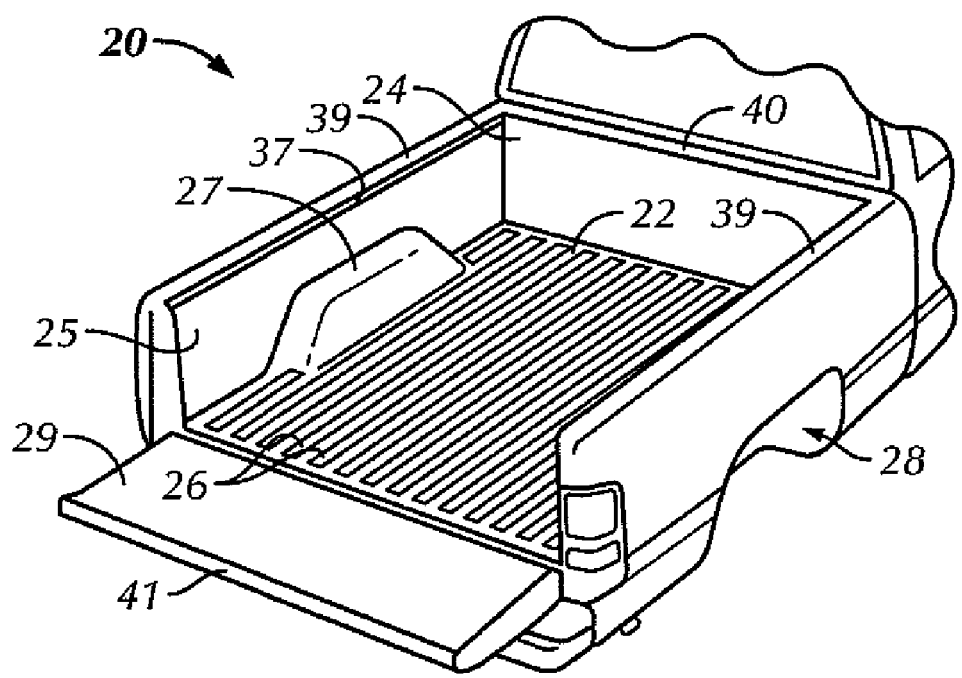
FIGS. 2A-2E present schematic drawings of a truck bed (2A) and embodiments of a bed liner described herein (2B-2E).
Figure 2B:
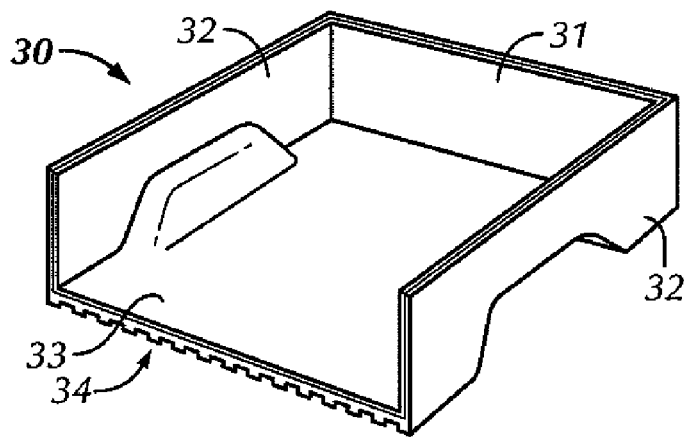
Figure 2C:
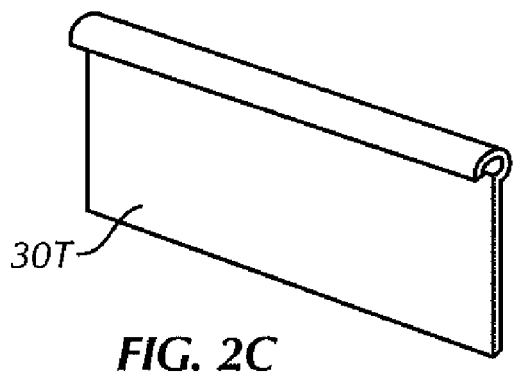

A one-piece bed liner 30, as illustrated in FIG. 2B, may be form fitted to mate with the surface and contours of a truck bed 20. Bed liner 30 may include a resilient layer 30R and a fabric layer 30F (see FIGS. 2D and 2E), where the fabric layer may be configured to be bonded to the wear surface of a vehicle. Liner 30 may include a front portion 31, which may overlay and protect front wall 24. Liner 30 may also include sides 32, which may overly and protect side walls 25. Liner 30 may also include a bottom 33, overlaying and protecting floor 22. If desired, a tailgate liner 30T may be used to protect tailgate 29, as illustrated in FIG. 2C.

In some embodiments, a bottom surface 34 of bottom 33 may be contoured to match the contours of truck bed 22, including a raised portion 34 protecting elevated portion 27. In other embodiments, a bottom surface 34 of bottom 33 may be contoured to mate with ridges 26, thereby minimizing any gaps that may promote collection of water, dirt, sand, etc. Contoured bottom surface 34 may also eliminate any shifting of liner 30 during use, minimizing any abrasive contact that might occur between floor 22 and liner 30.

Figure 2D:
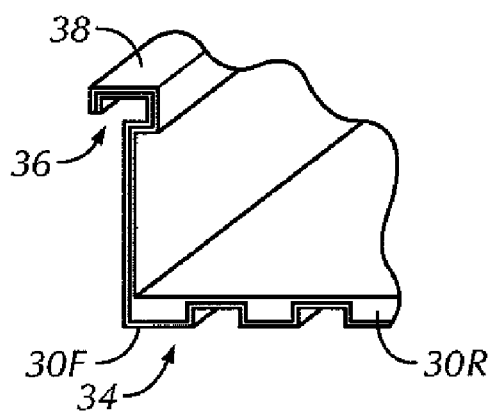
Figure 2E:
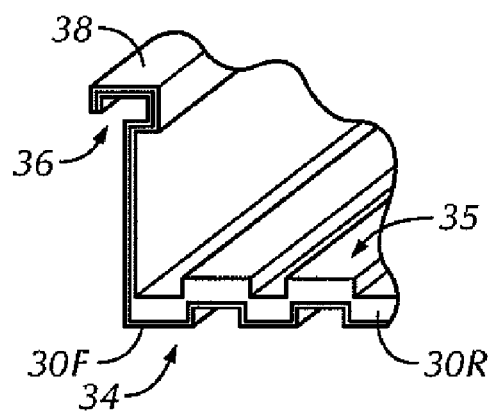

In addition to the contoured bottom surface 34, as illustrated in FIGS. 2B and 2D, bottom 33 may also have a contoured top surface 35, as illustrated in FIG. 2E. In this manner, the liner 30 may provide a ridged surface, similar to that of the underlying floor 22 of truck bed 20, providing additional strength or resilience to the liner and facilitating drainage from the lined bed.

In some embodiments, such as illustrated in FIGS. 2D and 2E, liner 30 may include an upper lip 36, such that the contour of the sides 32 mates with the structure of the side walls 25 of truck bed 20, engaging lip rail 37 (as shown in FIG. 2A). In this manner, the recesses of side walls 25 of truck bed 20 are maintained, thereby maximizing the cargo space and intimately attaching liner 30 to bed 20. The lip 36 may include a top portion 38 that overlays a top surface 39 of side walls 25, a top surface 40 of front wall 24, or a top surface 41 of tailgate 29.

Although illustrated generally in FIGS. 2B-2E, as mentioned above, the liner may be form-fitted or molded to mate with the contours of the truck bed. In addition to the contours previously mentioned (ridges 26 or lip rail 37, for example), those skilled in the art will recognize that truck bed 20 may also include other contours, depressions, etc., unique to a particular model or brand of truck. Liner 30 may be molded to match only a few of the contours, a majority of the contours, or each of the contours. Whereas embodiments where liner 30 matches most or all of the contours may provide for the maximum protection of truck bed 20, embodiments where liner 30 matches fewer contours may allow fewer iterations of liner 30 to be produced. Those skilled in the art will recognize that there are several ways to design a liner to protect a bed, including over-the-rail, as shown in FIGS. 2D-2E, under-the-rail, etc.

Figure 3A:
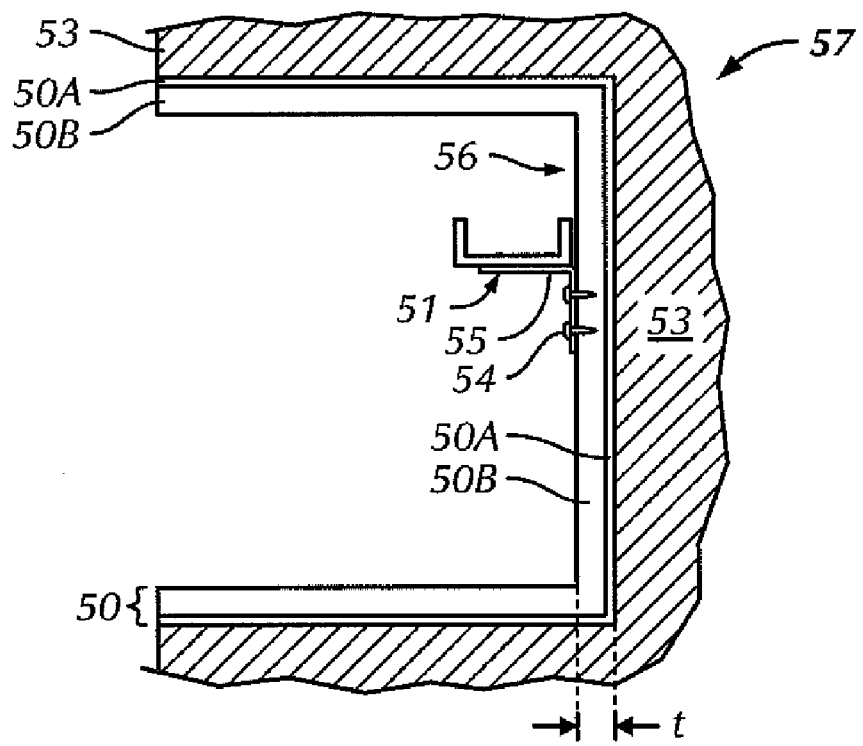
FIGS. 3A and 3B schematically present a side view (3A) and front view (3B) of embodiments of a liner described herein, where the liner may protect the surface of a cavity, such as a cabinet.
Figure 3B:
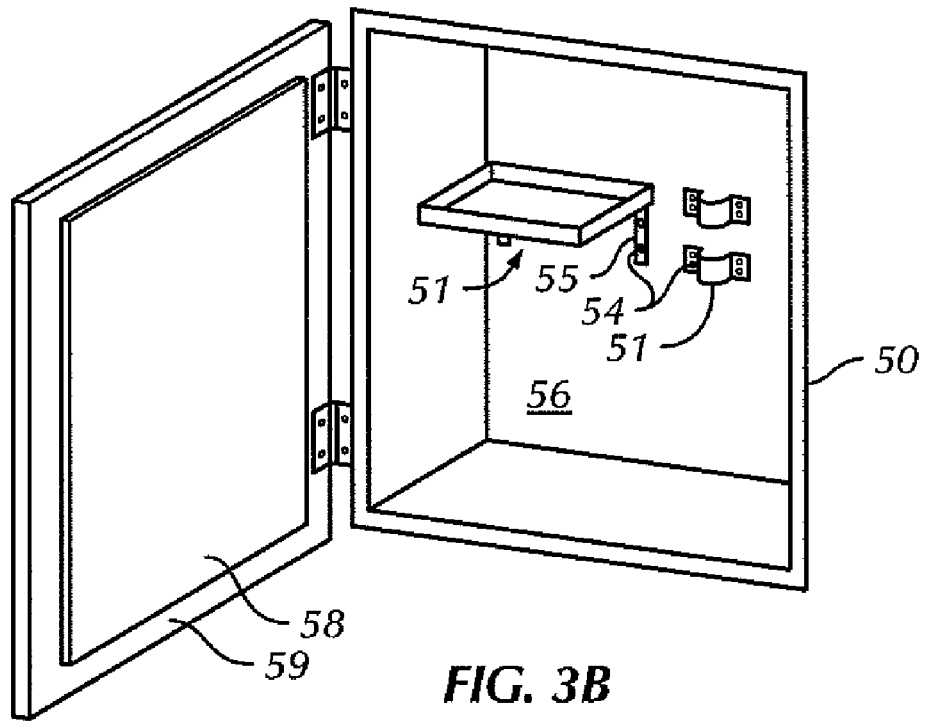

Referring now to FIGS. 3A-3B, one embodiment of a liner used to protect a cabinet or cavity, such as a fire engine storage compartment, is illustrated. The liner 50, having a fabric layer 50A and a resilient layer 50B, may be of unitary construction, form fitted or molded to mate with the surface and contours of the cavity 57.

In certain embodiments, it may be desired to install storage enhancing devices 51 (brackets, shelves, holders, clasps, etc.) in a cavity 57, such that equipment or other items may be stored in an organized or accessible fashion. A liner 50, in some embodiments, may be of a thickness and hardness such that various storage devices 51 may be attached to liner 50 for hanging or holding equipment (such as, for example, respiration equipment, tools, etc.)(not shown), where installation of the devices 51 does not require damage to the substrate 53. For example, a screw 54 may be used to hang bracket 55 on a back wall 56 of the storage compartment 57, wherein screw 56 penetrates to a depth equal to only a portion of the liner thickness t. In this manner, localized stress areas may be avoided, thus minimizing the potential for the substrate 53 to begin to rust, and minimizing the avenues for damaging moisture and chemicals to attack the substrate 53. In other embodiments, a liner 48 may be positioned on door 59, such that liners 50, 58 collectively protect the respective substrate surfaces from chemical or impact damage due to the contents stored inside compartment 57.

Multi-Component Construction

In some embodiments, the liner may be provided in multiple parts, as shown in FIGS. 4-6, 7A, and 7B, where each of the multiple parts may include a resilient layer bonded to a fabric layer similar to that as illustrated in FIGS. 1, 2D and 2E, where the fabric layer is configured to be adhered to the vehicle wear surface. Where the bed liner is formed from multiple pieces, in some embodiments, the multiple pieces may be interconnected, overlaid, or mated, modularly forming a cohesive protective layer over the substrate. The overlying or mated portions may be bound together using an adhesive in some embodiments, thus sealing the boundary between the component liner pieces.

In other embodiments, the seams between the component pieces may be filled with a composition similar to the resilient layer or "welded" together, such as by heat sealing or by using a composition that will bind the two surfaces at the seams. For example, in some embodiments, an activator compound, a vulcanizing agent, or a crosslinking agent may be applied to the seams, causing the contacting portions of the seams to meld together, sealing the seam areas. In other embodiments, heat may be applied to the abutting edges of the component pieces to intimately bond the component pieces.

Figure 4:
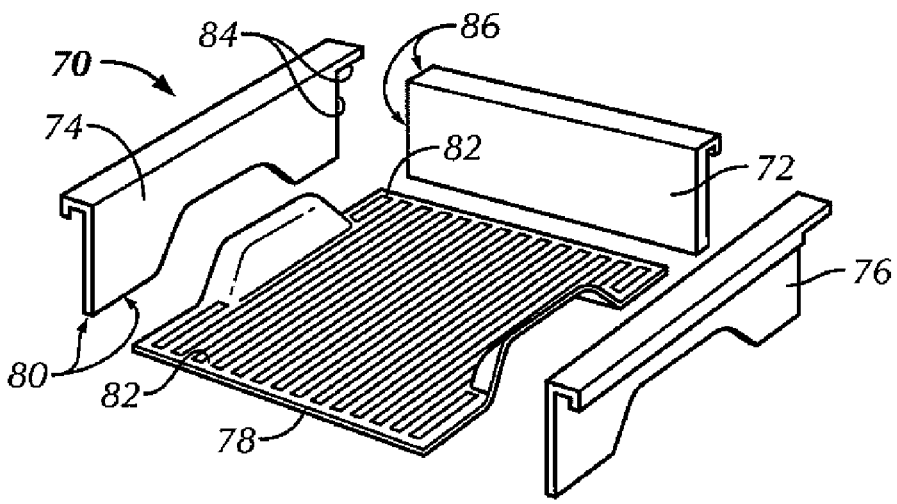
FIGS. 4-6 schematically present various multi-component liners formed in accordance with embodiments disclosed herein.

Referring now to FIG. 4, one embodiment of a multi-component bed liner is illustrated. A bed liner may be formed from one or more component pieces, as described above, where the embodiment of FIG. 4 provides a bed liner formed from four component pieces. The multi-component liner 70 includes front 72, left side 74, right side 76, and bottom 78. A component piece may also be provided to cover the tailgate.

The surfaces of each component part that abut, mate with, or overlie an adjacent component part may be adhesively bound, sealed, filled, or welded, as described above. For example, the bottom surface 80 of left side 74 may be adhesively bound to the top surface 82 of bottom 78. The interior surface 84 of left side 74 may be adhesively bound to the side surface 86 of front 72. Likewise, the abutting or mating surfaces of each of the component parts may be bound.

Figure 5:
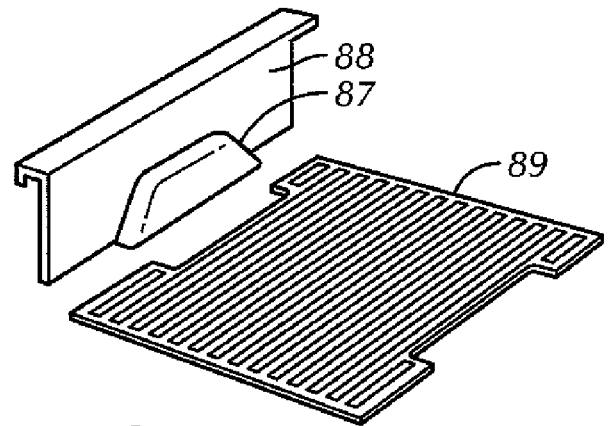
Figure 6:
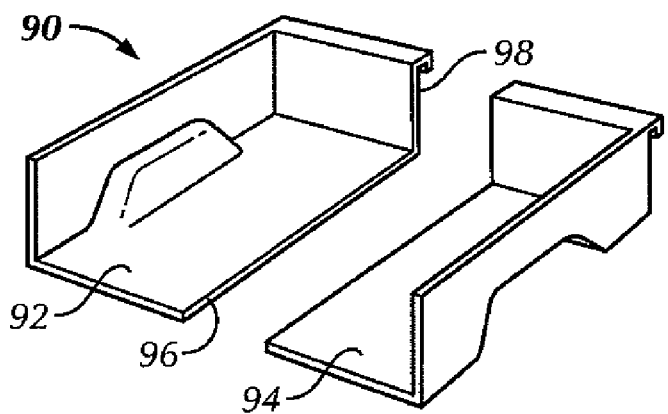
Figure 7A:
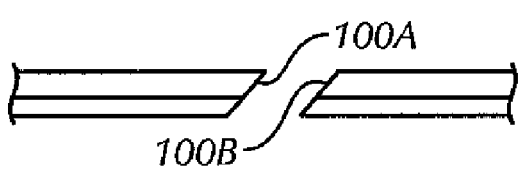
FIGS. 7A and 7B schematically illustrate embodiments of overlying portions of a multi-component liner formed in accordance with embodiments disclosed herein.
Figure 7B:
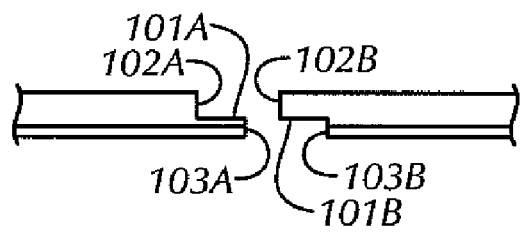

Depending upon the size of the component pieces of the bed liner, it may be beneficial, space-wise for storage and/or shipping, to form the component parts in other configurations. For example, in other embodiments, the multi-component bed liner may be formed where the contour of the wheel well 87 is formed as part of side wall 88, as illustrated in FIG. 5. Bottom 89, in this embodiment, may thus be formed from a flat piece. In the embodiment illustrated in FIG. 6, a truck bed liner 90 may be formed from two component pieces. Left liner part 92 and right liner part 94 may be installed, where seams 96, 98 may be sealed, filled, or welded, as described above.

Where it is desired to have the component pieces overlay or mate together, the component pieces may have seam edges contoured as illustrated in FIG. 7A or 7B. In the embodiment of FIG. 7A, angled surface edges 100A and 100B may be adhesively bound together or sealed as described above. It should be understood that the contact area may be changed by varying the angle of mating surfaces, etc. In the embodiment of FIG. 7B, one or more of the edges 101A/B, 102A/B, 103A/B may be adhesively bound together or sealed an overlapping joint as described above. Although illustrated and described in a limited number of embodiments, those skilled in the art will recognize that other configurations may be used to overlay or mate the component pieces.

Embodiments of the surface protective layer may also be useful in protecting various sized surfaces, such as the cabinet described in FIG. 3 above, where one or more component liner pieces may be custom fit to cover and protect the surface or a portion of the surface. For example, in one embodiment for the cabinet liner of FIG. 3, the cabinet may be lined with two or more component liner pieces, such as where the back, sides, bottom, and top of the cabinet are each individually lined, and the seams between the component liner pieces can be sealed, filled, or welded, as described above.

The unitary or multi-component liners, as described above, may protect a substrate against water or dirt accumulation, etc., protecting against corrosion, rust, abrasive damage, chemical attack, or deleterious impacts.

Forming the Liner

Embodiments of the liner described herein may be formed by injection molding, thermoforming, blow molding, spray molding, or any other process used to form shaped articles. For example, in some embodiments, the liner or parts of a liner may be formed by spray coating a resilient layer onto a fabric substrate. In some embodiments, the resilient layer may be sprayed, coated, or skim coated onto a fabric, forming a resilient layer having a uniform thickness on the substrate fabric. Where various shaped liners may be desired, the coated substrate may be shaped while the coating is curing, or, in other embodiments, the formed liner may subsequently be thermoformed or molded into a desired shape. In other embodiments, the coated substrate may be flexible, such that the liner may be shaped to conform to the dimensions of the underlying substrate to be protected. In other embodiments, the composite material may be vulcanized in the mold.

In some embodiments, the liner may be formed in a mold. For example, in one embodiment, a liner, having a fabric layer or a reinforcing fabric layer and a composite or polymer material as a resilient liner, may be formed by first placing the fabric in a mold tool. The mold tool may then be closed and liquid polymer may be injected into the mold tool by injection molding so as to bond or wholly encapsulate the fabric to the resilient layer, forming a liner having a desired shape. Where the fabric is used as a reinforcing layer, an inward force may be exerted on opposite faces of the fabric within the mold tool by fingers protruding inwardly from inside faces of the mold tool, the fingers being operable to engage the reinforcing fabric when the mold tool closes. The fingers may include inwardly projecting pegs which align with crossing points of the fabric to space the fabric from corresponding upper and lower internal surfaces of the mold tool and ensure that the reinforcing fabric is buried within the polymer or composite material which is injected into the mold tool during the manufacturing process. The polymer or composite material is allowed to cure and then the liner may be removed from the mold tool.

In other embodiments, the liner may be formed by first adhesively bonding a fabric to a surface. The resilient layer may then be sprayed onto the fabric coated surface, where the fabric acts as a bridge, bonding the resilient layer to the surface. In some embodiments, the resilient layer may be removably bound to the fabric layer.

The liner may be formed, in some embodiments, from a vulcanized rubber bound to a fabric layer. In some embodiments, the fabric layer and the vulcanized rubber may be adhesively bound. In other embodiments, the fabric layer may be chemically bound, such as where the fabric layer and the vulcanized rubber are at least partially crosslinked. The fabric layer may serve as a bridge, allowing the vulcanized rubber to be removably bound to a substrate to be protected.

Embossing/Printing

Figure 8A:
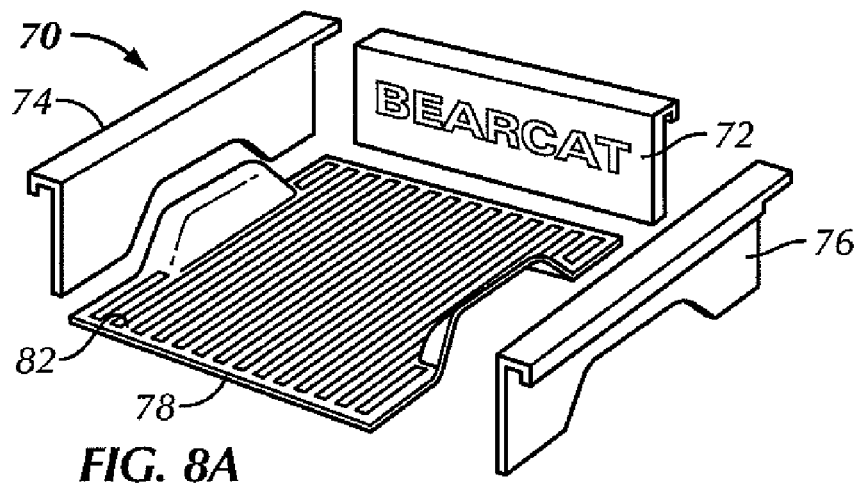
FIGS. 8A and 8B schematically illustrate liners having graphics or decorative textures according to embodiments disclosed herein.
Figure 8B:
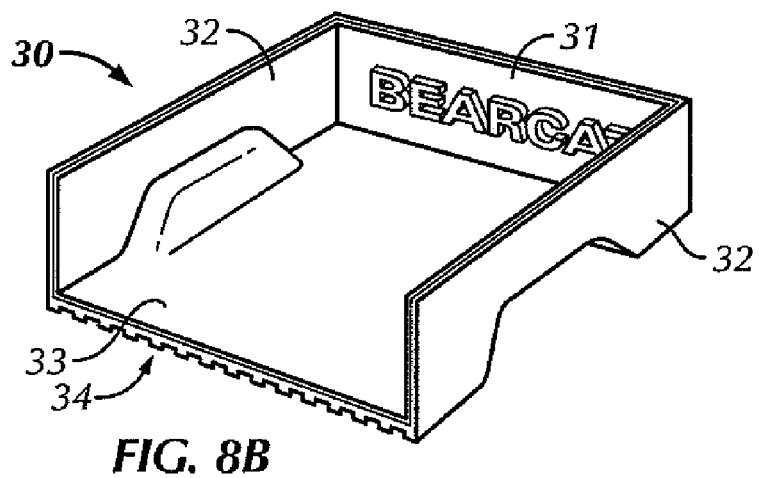

In some embodiments, the exposed surface of a liner may be printed with graphics, such as indicia (indications of the manufacturer, for example) or aesthetic designs. In other embodiments, the liner may provide a slot or recessed area for placement of indicia, such as described in U.S. Pat. No. 6,076,879, for example. In other embodiments, letters or graphics may be molded into the liner, for example, where the outer surface of a liner may contain raised lettering using a specialized mold, such as described in U.S. Pat. No. 5,308,133. In some embodiments, for example, the surface of the liner may include graphics, logos, pictures, decorative textures, and the like. Examples of liners having graphics or decorative textures are illustrated in FIGS. 8A and 8B.

In addition to printing, embossing, or custom molding, embodiments of the liner described herein may be marked to pinpoint drill targets for tie-down hardware. In other embodiments, the liner may be marked to identify target locations of drain holes. In other embodiments, cutouts for the tie-down hardware locations and drain holes may be provided. In yet other embodiments, the tie-down hardware locations and drain holes may be removed (or pre-drilled) prior to shipment to a customer or retailer.

Advantageously, embodiments described herein may provide for a liner that may protect a substrate from physical and/or chemical attack. Some embodiments of the liner described herein may provide for a liner which forms an intimate bond with a substrate, minimizing or eliminating the accumulation of dirt, debris, or water between the liner and the substrate. Other embodiments of the liner disclosed herein may provide for ease of installation, requiring minimal surface preparation. Other embodiments of the liner disclosed herein may advantageously provide for removably attaching the liner to a substrate, thereby facilitating any needed repairs or replacement, such as by use of a carpet knife, a hook knife, or other appropriate tools. Other embodiments described herein may provide for a hybrid bed liner that encompasses one or more of the following aspects: easily installable, easily removable, excellent impact and chemical resistance, minimal or no damage to the surface upon installation or removal, inexpensive, lightweight, sturdy, and heat and UV stability, among others.

While embodiments of the bed liner described herein have utility in pickups and vans, it should be understood, however, that it may also be applied to other uses. For example, embodiments of the liner may accordingly be directed at providing a lined surface for buses, campers, motor homes, horse trailers, and the like. In addition, embodiments of the liner system may also be used in commercial and/or recreational boats.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

All priority documents are herein fully incorporated by reference for all jurisdictions in which such incorporation is permitted. Further, all documents cited herein, including testing procedures, are herein fully incorporated by reference for all jurisdictions in which such incorporation is permitted to the extent such disclosure is consistent with the description of the present invention.

What is claimed:

1. A method to protect a vehicle wear surface, the method comprising:
    covering the vehicle wear surface with a plurality of liner sections;
    wherein each liner section comprises a resilient layer and a fabric layer;
    adhering the fabric layer of each liner section to the vehicle wear surface; and
    joining adjacent liner sections together;
    wherein the adhering comprises adhesively bonding the plurality of liner sections to the vehicle wear surface.

2. The method of claim 1, wherein the adhering comprises removably bonding the plurality of liner sections to the vehicle wear surface.

3. The method of claim 1, wherein the adhering the fabric layer comprises forming a water-tight seal between the fabric layer and the wear surface.

4. The method of claim 1, wherein adjacent liner sections are configured to be bonded together to form a seal, and wherein the joining adjacent liner sections comprises forming a seal.

5. The method of claim 4, wherein the seal comprises angled surface edges, an overlapping joint, or combinations thereof.

6. The method of claim 1, wherein each liner section is individually replaceable.

7. The method of claim 1, wherein at least one of the plurality of liner sections is contoured to form an intimate fit with the vehicle wear surface.

8. The method of claim 1, wherein the vehicle wear surface comprises a pickup truck bed.

9. The method of claim 1, wherein the resilient layer comprises at least one of an acrylate polymer, a urethane polymer, a vinyl rubber, a vinyl polymer, a polyolefin, a urethane rubber, a vulcanized rubber, and a vulcanized urethane.

10. The method of claim 1, wherein the fabric layer comprises at least one of natural fibers, metal fibers, and synthetic fibers.

11. The method of claim 1, wherein the fabric layer has an average thickness from about 0.05 mm to about 5.0 mm, and wherein the resilient layer has an average thickness from about 0.1 mm to about 50.0 mm.

12. The method of claim 1, wherein the resilient layer further comprises a reinforcing fabric layer.

13. The method of claim 1, wherein the resilient layer has a durometer hardness from about 10 Shore A to about 80 Shore D.

14. The method of claim 1, further comprising disposing a graphic image on an outer surface of the resilient layer, molding a three dimensional image into the resilient layer, or combinations thereof.

15. The method of claim 1, wherein the fabric layer comprises:
    a first fabric layer bonded to the resilient layer; and
    a second fabric layer bonded to the first fabric layer;
    wherein the adhering comprises adhering the second fabric layer to the wear surface of the vehicle.

16. The method of claim 15, wherein the first fabric layer comprises a non-woven component comprising at least one fibrous component and at least one polymeric component.

17. The method of claim 16, wherein the at least one fibrous component comprises at least one of cotton, acrylic, rayon, carbon, glass, nylon, thermoplastic, and bicomponent thermoplastic fibers.

18. The method of claim 16, wherein the at least one polymeric component comprises at least one of a polyethylene and a polypropylene.

19. The method of claim 1, wherein the fabric layer comprises a non-woven component comprising at least one fibrous component and at least one polymeric component.

20. The method of claim 19, wherein the at least one fibrous component comprises at least one of cotton, acrylic, rayon, carbon, glass, nylon, thermoplastic, and bicomponent thermoplastic fibers.

21. The method of claim 19, wherein the at least one polymeric component comprises at least one of a polyethylene and a polypropylene.

* * * * *